United States Patent [19]

Nagasawa et al.

[11] Patent Number: 5,861,447
[45] Date of Patent: Jan. 19, 1999

[54] AQUEOUS PIGMENT INK COMPOSITION

[75] Inventors: Toshiyuki Nagasawa, Yawata; Sohko Itoh, Neyagawa; Aiko Okamura, Shijonawate, all of Japan

[73] Assignee: Orient Chemical Industries, Ltd., Osaka, Japan

[21] Appl. No.: 896,809

[22] Filed: Jul. 18, 1997

[30] Foreign Application Priority Data

| Jul. 19, 1996 | [JP] | Japan | ................................. | 8-190508 |
| Jul. 19, 1996 | [JP] | Japan | ................................. | 8-190509 |
| Aug. 28, 1996 | [JP] | Japan | ................................. | 8-226559 |

[51] Int. Cl.$^6$ ................................. C09D 11/18
[52] U.S. Cl. ........................ 523/161; 106/472; 106/478; 524/496
[58] Field of Search .................... 523/160, 161; 524/496; 106/472, 478

[56] References Cited

U.S. PATENT DOCUMENTS

| 4,592,814 | 6/1986 | Vaughan | ................................. | 204/78 |
| 5,632,927 | 5/1997 | Ferrier | ................................. | 252/62.2 |
| 5,686,508 | 11/1997 | Shimomura | ................................. | 523/161 |

OTHER PUBLICATIONS

English abstract of Japanese Kokai Publication No. 64–6074.
English abstract of Japanese Kokai Publication No. 2–276872.
English abstract of Japanese Kokai Publication No. 2–276875.
English abstract of Japanese Kokai Publication No. 3–134073.
English abstract of Japanese Kokai Publication No. 3–210373.
English abstract of Japanese Kokai Publication No. 4–149286.
English abstract of Japanese Kokai Publication No. 7–268258.

*Primary Examiner*—Paul R. Michl
*Attorney, Agent, or Firm*—Birch, Stewart, Kolasch & Birch, LLP

[57] ABSTRACT

An aqueous pigment ink composition comprising an oxidized carbon black obtained by wet-oxidation of a carbon black using a hypohalous acid and/or salt thereof, and a water-soluble cationic polymer or oligomer in an aqueous medium. The aqueous pigment ink composition of the present invention does not cause clogging in a nozzle when used for ink jet recording, enables smooth writing from a narrow pen tip, and provides a recorded image excellent in water resistance and light resistance and excellent in density and hue.

29 Claims, No Drawings

AQUEOUS PIGMENT INK COMPOSITION

FIELD OF THE INVENTION

The present invention relates to an aqueous pigment ink composition, more particularly to an aqueous pigment ink composition comprising an oxidized carbon black having improved water dispersibility as a coloring agent.

PRIOR ART

Conventionally, aqueous dye ink comprising a black dye has been mainly used as a recording solution for writing implements and ink jet printers. Recently, an aqueous pigment ink composition using a pigment such as carbon black has been noticed in order to provide light resistance and water resistance to a recorded image.

In such kind of pigment ink, carbon black of various brands commercially available for coloring agents (for coloring) are used. Acidic carbon black is believed to carry an acidic group such as a carboxyl group on the surface thereof. These are generally obtained by moderately oxidize the carbon black for coloring, such as for example furnace black, by a surface modifying method such as a gas phase or liquid phase oxidation method, a plasma treatment method or the like using a usual oxidizing agent such as ozone, nitric acid, hydrogen peroxide, nitrogen oxide and the like.

These conventional acidic carbon black or channel black shows a certain hydrophilicity, however, has insufficient affinity and dispersion stability against an aqueous medium, and manifests poor dispersibility in water by itself. Therefore, when these are used as a coloring agent of an aqueous pigment ink composition, these are required to be dispersed in an aqueous medium and stabilized using a dispersing machine in the presence of so-called pigment dispersing agents, such as water-soluble various synthetic polymers and surfactants.

For example, Japanese Patent Laid-Open Publication No. sho 64-6074 and No. Hei 4-149286 describe an aqueous pigment ink composition comprising an acidic carbon black, dispersing agent (anionic surfactant, polymeric dispersing agent) and buffering solution. Further, Japanese Patent Laid-Open Publication No. Hei 3-210373 describes ink for jet printing comprising acidic carbon black and water-soluble anionic polymer having a volatile content of 3.5 to 8% by weight. Further, Japanese Patent Laid-Open Publication No. Hei 3-134073 describes an ink jet recording solution comprising neutral or basic carbon black and an water-soluble resin.

In general, for stable discharging of droplets from a fine end of an ink jet recording head and for smooth writing with narrow pen point of an aqueous ball-point pen, it is necessary to prevent setting of an ink in the orifice of an ink jet recording head and the tip of a ball-point pen.

However, when commercially available carbon black is used like a conventional aqueous pigment ink composition, a resin constituting the dispersing agent adheres to the orifice and the like and is not re-dissolved, and clogging and unemitting of droplets easily occur. Also, since aqueous pigment ink composition comprising a dispersing agent is viscous, the ink generates resistance in the route leading to the end of a nozzle, discharging becomes unstable and smooth recording becomes difficult, when continuous discharging for a long period of time and high speed printing are conducted. Further, the conventional aqueous pigment ink composition has defects that pigment content can not be fully increased since discharging stability should be secured, and printing density becomes insufficient by comparison with aqueous dye ink (recording solution).

To solve these defects, the present inventors disclosed the aqueous pigment ink composition containing no dispersing agent in Japanese Patent Application No. Hei 8-98436. In the aqueous pigment ink composition described here, water dispersibility of carbon black used as a coloring agent is remarkably improved, and a resinous component such as the dispersing agent is not contained. Therefore, this aqueous pigment ink composition does not cause clogging in a nozzle when used for ink jet recording, and provides smooth writing from a narrow pen tip.

However, when this aqueous pigment ink composition is used, it is desired to improve dying fastness, water resistance, and image quality of a recorded image after recording.

Further, there is a problem that, in general, the smaller the average particle size of carbon black is, the more reddish it becomes, and printing density is scarcely improved even if the content of carbon black is increased. Therefore, the above-described aqueous pigment ink composition comprising carbon black in finely dispersed condition, have to be controlled its hue to obtain excellent recorded image density and hue.

For example, Japanese Patent Laid-Open Publication No. Hei 2-276872 describes a recording solution comprising carbon black and a specific trisazo direct dye, Japanese Patent Laid-Open Publication No. Hei 2-276875 describes a recording solution comprising carbon black and a specific disazo acidic dye, and Japanese Patent Laid-Open Publication No. Hei 7-268258 describes a recording solution for ink jet printing comprising carbon black and a water-insoluble phthalocyanine-based coloring material.

However, in the aqueous pigment ink composition, there are problems in dispersion stability and re-dispersibility since commercially available carbon black is used. The ink is not re-dissolved or re-dispersed in an orifice and the like, and clogging, unemitting of droplets and the like easily occur. Further, there are problems that an acidic dye and direct dye have poor water resistance and light resistance by comparison with carbon black, the acidic dye and direct dye are subjected to blotting and discoloration, unevenness easily occur in a recorded image, dark and pale parts are produced in prints in a long period, and the like.

The object of the present invention is to provide an aqueous pigment ink composition which does not cause clogging in a nozzle when used for ink jet recording, enables smooth writing from a narrow pen tip, and provides a recorded image excellent in water resistance and light resistance and excellent in density and hue.

SUMMARY OF THE INVENTION

The present invention provides an aqueous pigment ink composition comprising oxidized carbon black obtained by wet-oxidation of carbon black using a hypohalous acid and/or salt thereof, and a water-soluble cationic polymer or oligomer in an aqueous liquid medium.

Further, the present invention provides an aqueous pigment ink composition comprising oxidized carbon black obtained by wet-oxidation of carbon black using a hypohalous acid and/or salt thereof, and a water-soluble cationic surfactant in an aqueous liquid medium.

Further, the present invention provides an aqueous pigment ink composition comprising oxidized carbon black obtained by wet-oxidation of carbon black using a hypohalous acid and/or salt thereof, and a basic dye in an aqueous liquid medium.

In the aqueous pigment ink composition of the present invention, the oxidized carbon black is produced preferably by the method which comprises the steps of (a) dispersing finely carbon black in water, (b) oxidizing the carbon black using a hypohalous acid and/or salt thereof, and (c) purifying and concentrating the resulted solution after the steps (a) and (b) to obtain a water dispersion having a pigment content of 10 to 30% by weight. Alternatively, the oxidized carbon black is produced preferably by the method which comprises the step of neutralizing a part of acidic groups existing on the surface of the carbon black with a volatile basic compound after the steps (a) and (b).

DETAILED DESCRIPTION OF THE INVENTION

The oxidized carbon black contained in the aqueous pigment ink composition of the present invention is obtained by a wet-oxidation treatment of carbon black using a hypohalous acid and/or salt thereof. The carbon black which is used as a raw material for the oxidized carbon black is generally a carbon powder which is obtained by thermal decomposition or incomplete combustion of a natural gas and liquid hydrocarbon (heavy oil, tar and the like). These are classified into channel black, furnace black, lamp black and the like depending on the production method, and are commercially available.

The kind of the carbon black used as a raw material is not particularly restricted. Any of the above-described acidic carbon black, neutral carbon black and alkaline carbon black can be used.

Specific examples of the carbon black include #10B, #20B, #30, #33, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600, MCF88 and the like manufactured by Mitsubishi Kagaku K.K.; Monarch 120, Monarch 700, Monarch 800, Monarch 880, Monarch 1000, Monarch 1100, Monarch 1300, Monarch 1400, Mogul L, Regal 99R, Regal 250R, Regal 300R, Regal 330R, Regal 400R, Regal 500R, Regal 660R and the like manufactured by Cabot K.K.; Printex A, Printex G, Printex U, Printex V, Printex 55, Printex 140U, Printex 140V, Special black 4, Special black 4A, Special black 5, Special black 6, Special black 100, Special black 250, Color black FW1, Color black FW2, Color black FW2V, Color black FW18, Color black FW200, Color black S150, Color black S160, Color black S170 and the like manufactured by Degussa K.K.; and the like.

The acidic carbon black is preferred to be used as a raw material since it has acidic groups such as a phenolic hydroxyl group, carboxyl group and the like on the surface of the particle. The acidic carbon black has pH of generally not more than 6, particularly not more than 4.

Specifically, the acidic carbon black is commercially available from Mitsubishi Kasei K.K. under the trade name of MA8, MA100, 2200B and 2400B, from Degussa K.K. under the trade name of Color carbon black FW200, Color black FW18, Color black S150, Color black S160, Color black S170, Printex U and Printex 1400, from Cabot K.K. under the trade name of Monarch 1300, Mogul L and Regal 400R, from Columbian Carbon K.K. under the trade name of Raven 1200, Raven 1220 and Raven 1225.

Specifically, the neutral or basic carbon black is commercially available from Mitsubishi Kasei K.K. under the trade name of #33, #45, #45L, #10B, #4000B, #2300, #2400 and #900, from Degussa K.K. under the trade name of Color Furnace such as Printex 35, Printex 60, Printex 300, Printex A and the like, from Cabot K.K. under the trade name of Oil Furnace such as Regal 330R, Regal 300R, Regal SR and the like, from Columbian Carbon K.K. under the trade name of Raven 40, CONDUCTEX SC and MOLACCO LS.

Such carbon black is wet-oxidized in water using a hypohalous acid and/or salt thereof. Specific examples of a hypohalous acid and/or salt thereof include sodium hypochlorite and potassium hypochlorite, and sodium hypochlorite is preferable from the viewpoint of reactivity.

The oxidation reaction is conducted by charging carbon black and hypohalite (for example, sodium hypochlorite) in a suitable amount of water, and by stirring the resulting solution at a temperature of not less than room temperature, preferably from 95° to 105° C. for 5 hours or more, preferably from about 10 to 15 hours. In this reaction, it is preferable that the carbon black is Subjected to oxidation treatment in finely dispersed condition.

The term "finely dispersing" in the present specification means that a secondary particle of carbon black is at least finely ground in water to be micronized to the size of a primary particle or the near size. The average particle size of the finely dispersed carbon black is generally not more than 300 nm, preferably not more than 150 nm, more preferably not more than 100 nm.

In general, finely dispersing is conducted by wet-grinding operation in an aqueous medium for 3 to 10 hours using a mill medium and a grinding apparatus. As the mill medium, glass beads, zirconia beads, magnetic beads, stainless beads and the like are used. As the grinding apparatus, a ball mill, attriter, flow jet mixer, impeller mixer, colloidal mill, sand mill (for example, BEAD MILL, SAND GRINDER, SUPER MILL, AGITATOR MILL, DINAU MILL (trade name)) and the like are included.

However, there is also a case in which the carbon black is finely dispersed only by high speed stirring using a homogenizer (homomixer) and the like in an aqueous solvent depending on the kind of the carbon black used as a raw material.

The finely dispersing is not necessarily conducted before the oxidation treatment, and may be conducted simultaneously with the oxidation treatment by conducting stirring or grinding in an aqueous solution of a hypohalite and the like.

The amount used of the hypohalite differs depending on the kind thereof, and usually from 1.5 to 150% by weight, preferably from 4 to 75% by weight in terms of 100% based on the weight of carbon black.

The resulted oxidized carbon black has a oxygen content of not less than about 3% by weight, preferably not less than about 5% by weight, more preferably not less than 10% by weight. As a result of oxidation treatment by the method of the present invention, the oxygen content increases by several to dozens of times based on the oxygen content of the carbon black before the treatment.

The measurement of the oxygen content is conducted by "Inert Gas—Infrared Ray Absorption Method". This method is conducted by heating a sample in an inert gas flow such as helium and the like, extracting oxygen as carbon monoxide, and the amount of carbon monoxide is measured by an infrared absorption method.

The feature of the aqueous pigment ink composition of the present invention is not restricted only by the oxygen content of the oxidized carbon black contained. Though the reason for this is not clear, the oxidized carbon black in the present invention forms a stable water dispersion by comparison with a commercially available carbon black, even if the oxygen content is 3 to 10% by weight.

It is said that, in a reaction between a carbon black and hypohalite, in general, various functional groups existing on the surface of the carbon black are oxidized, and a carboxyl group and hydroxyl group are formed. These polar groups have active hydrogen, and this active hydrogen content can be measured by, for example, Zeisel method.

It is preferable that the oxidized carbon black used in the aqueous pigment ink composition of the present invention has high surface active hydrogen content (mmol/g). It is because such oxidized carbon black shows particularly excellent water dispersibility. The surface active hydrogen content of the oxidized carbon black contained in the aqueous pigment ink composition of the present invention is not particularly restricted, and preferably not less than at least about 0.3 mmol/g, more preferably not less than about 1.0 mmol/g.

In general, carbon black having high surface active hydrogen content has enhanced hydrophilicity itself, since it has on the surface a lot of hydroxyl groups and carboxyl groups carrying active hydrogen. Further, it is supposed that the surface area of the carbon black increases simultaneously, and the surface of the carbon black has such chemical property as if it were an acidic dye, consequently the water dispersibility becomes excellent.

The feature of the aqueous pigment ink composition of the present invention is not restricted only by the surface active hydrogen content of the oxidized carbon black contained. That is, not all carbon black having an active hydrogen content of about 0.1 to about 1.0 mmol/g attain the object of the present invention.

The dispersion of the oxidized carbon black after the oxidation treatment is then filtered (with heating), the resulting wet cake is re-dispersed in water, then beads and coarse particles are removed using a mesh wire gauze. Alternatively, after beads and coarse particles are removed, the wet cake is washed with water to remove a by-produced salt. Alternatively, a slurry from which beads and coarse particles have been removed is diluted with a lot of water, then membrane purification and concentration may be conducted without any pre-treatment.

It is preferable that the wet cake of this oxidized carbon black is optionally re-dispersed in water, and subjected to acid treatment using a mineral acid (for example, hydrochloric acid and sulfuric acid). The acid treatment is preferably conducted by adding hydrochloric acid to the water dispersion to control pH thereof to not more than 3, and by heating and stirring the dispersion at a temperature of not less than 80° C. for 1 to 5 hours. It is because the acid treatment is advantageous for forming an ammonium salt or amine salt by aqueous ammonia or an amine compound, and for adsorption of a water-soluble cationic polymer or oligomer in the next step. Then, the dispersion is filtered, washed with water, and the resulting wet cake is re-dispersed in water.

The dispersion of the oxidized carbon black is then optionally neutralized with a basic compound, preferably an amine compound. Since acid groups exist on the surface of the oxidized carbon black, at least a part of them bonds (ionic) with an amine compound to form an ammonium salt or amine salt. In this way, by converting the oxidized carbon black to an amine salt, dispersion stability of the aqueous pigment ink composition, prevention of nozzle clogging, and water resistance when recorded on paper are improved.

As a preferable amine compound, a water-soluble volatile amine, alkanol amine and the like are included. Specific examples include ammonia, volatile amines substituted with an alkyl group having 1 to 3 carbon atoms (for example, methylamine, trimethylamine, diethylamine, propylamine); alkanolamines substituted with an alkanol group having 1 to 3 carbon atoms (for example, ethanolamine, diethanolamine, triethanolamine); alkylalkanolamines substituted with an alkyl group having 1 to 3 carbon atoms and an alkanol group having 1 to 3 carbon atoms, and the like. Particularly preferable amine compound is ammonia. However, not all acidic groups are required to be converted to an ammonium salt or amine salt. A part of the acidic groups is rather required to remain so that a water-soluble cationic polymer or oligomer used in forming ink, can be adsorbed on the surface of the carbon black.

The amine compound can be used in combination of two or more. Further, acidic groups existing on the surface of the oxidized carbon black may be partially converted to an alkaline metal salt for controlling affinity and dispersion stability against an aqueous medium and for preventing metal corrosion, and in this case, sodium hydroxide, potassium hydroxide, lithium hydroxide and the like are used as a basic compound together with an amine compound.

The dispersion of the oxidized carbon black which has been converted to an amine salt is then purified and concentrated using separating membrane having fine pores such as reverse osmosis membrane and ultrafiltration membrane. The concentration is conducted, in general, so that a concentrated pigment dispersion is obtained in which the carbon black content is about from 10 to 30% by weight based on water. The resulting pigment dispersion can be used as an aqueous pigment ink composition without any treatment, and in this case, the content of carbon black is preferably from 1 to 20% by weight. The concentrated pigment dispersion may further be dried to form a powdery pigment, or may further be concentrated to form a pigment dispersion having a pigment content of about 50% by weight. Then, these are dispersed in the aqueous medium described below, other components are added to the dispersion, and the concentration thereof is suitably controlled to prepare the aqueous pigment ink composition of the present invention.

The oxidized carbon black of the present invention is generally desired to be contained in an amount from 1 to 50% by weight, preferably from 2 to 20% by weight based on the total amount of the aqueous pigment ink composition. The reason for this is that when the content of the carbon black is less than 1% by weight, printing or writing density is insufficient, and when over 20% by weight, the carbon black easily flocculates, a precipitation is formed and discharging stability becomes worth during long period of storage.

It is preferred that the average particle size of the carbon black in the aqueous pigment ink composition of the present invention is not more than 300 nm, especially not more than 150 nm, further not more than 100 nm. The reason for this is that when the average particle size of the carbon black is over 300 nm, the pigment easily precipitates.

It is preferable that the aqueous pigment ink composition of the present invention further comprises a water-soluble cationic polymer or oligomer. The reason for this is that water resistance and dying fastness of a recorded image after recording with the aqueous pigment ink composition are improved by addition of these compounds.

This water-soluble cationic polymer or oligomer is not expected so much to have an ability to disperse a pigment, and it differs from a pigment dispersing agent usually used in this point. The reason for this is that the oxidized carbon black itself has excellent dispersibility and re-dispersibility in an aqueous medium.

In general, when lipophilic carbon black is dispersed in a water-based solvent, a dispersing agent is used. The dispersing agent should contain a hydrophilic group and lipophilic group placed in well balance, and the lipophilic group should be adsorbed strongly on the surface of the carbon black. However, the water-soluble cationic polymer or oligomer used in the present invention is not required to be adsorbed strongly on the surface of the carbon black, therefore, the lipophilic group of the water-soluble cationic polymer or oligomer may have weak lipophilicity by comparison with usual dispersing agents.

However, dispersion stability and discharging stability of the aqueous pigment ink composition should not be harmed by including the water-soluble cationic polymer or oligomer. Therefore, it is necessary to use the water-soluble cationic polymer or oligomer which can wrap carbon black in fine particulate condition to prevent the formation of bulky flocculates in drying. The water-soluble cationic polymer or oligomer should be easily re-dissolved, in order to avoid setting of ink in an orifice or nozzle.

The water-soluble cationic polymer or oligomer includes a cationic polymer having a weight-average molecular weight of not more than 100000, preferably not more than 50000. In other word, a polymer or oligomer having a number-average molecular weight of not more than 50000, preferably from 20000 to 1000 is included.

When the average molecular weight of the polymer is not less than 100000, viscosity of the ink and particle size of the dispersion increase and excellent discharging stability is not obtained. Amine value of the polymer differs depending on the kind of the cationic polymer and not particularly restricted, but it is preferable that the amine value is generally from about 5 to 30 (mg eq/g polymer-solid).

Examples of the water-soluble cationic polymer or oligomer used in the present invention include polyallylamine represented by the formula:

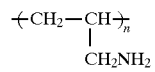

polyvinylamine represented by the formula:

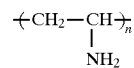

polyethyleneimine represented by the formula:

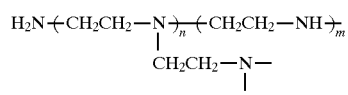

polyvinyl pyrrolidone represented by the formula:

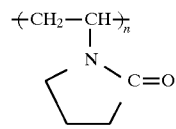

polyamidine (hydrochloride) represented by the formula:

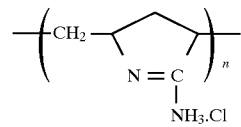

polyamine sulfone represented by the formula:

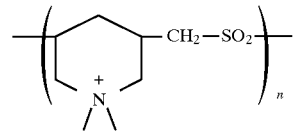

and, polyimine represented by the formula:

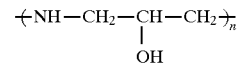

and the like (wherein, m and n are a positive integer).

Other example include a cation modified compound of polyacrylamide, a copolymer of acrylamide and cationic monomer, hydroxypropyl polyethyleneimine, polyamide-epichlorohydrin resin, quaternary polyvinylpyridinium, alkyl polyvinylpyrrolidone and the like; and homopolymers of vinylpyrrolidone-based monomer, oxazoline-based monomer, vinyloxazolidone-based monomer and vinylimidazol-based monomer, and copolymers of these monomers with usual monomers such as acrylamide, methacrylamide, acrylate, methacrylate, tert-butyl acrylate, vinyl ether, acrylonitrile, vinyl acetate, ethylene, styrene and the like.

Polyallylamine, polyvinylamine, polyethyleneimine and polyvinylpyrrolidone and the like are preferably used.

Further, an amine-added epoxy resin, amine-added polybutadiene resin, acrylamine copolymer resin, amine-added acrylic resin, amine-added methacrylic resin, acrylamide resin, copolymer of acrylamide with a cationic monomer, resin having an oxazoline group, methacrylamide resin having a cationic group, methacrylamine copolymer having a cationic group, cation-modified polyvinylalcohol, cation-modified cellulose, water-soluble copolymer prepared from a vinyl-based monomer having a cationic group with a vinyl-based monomer, or, cationic urea resin, cationic sizing agent, and the like can also be used within the technical scope of the present invention. A nonionic polymer can be optionally added in the range which does not interfere with the effect of the present invention.

Specific examples of the water-soluble cationic polymer or oligomer include polyallylamine (PAA), polyallylamine hydrochloride (PAA-HCl) manufactured by Nitto Boseki K.K., polyvinylamine (PVAM 0595B) manufactured by Mitsubishi Kagaku K.K. polyethyleneimine (Epomine PS-012, PS-200, P-1000) and the like.

These water-soluble cationic polymers or oligomers are preferably used in an amount from 0.1 to 20% by weight based on the total amount of the aqueous pigment ink composition of the present invention and in an amount from 1 to 1/10 fold of the weight of the oxidized carbon black contained in the ink of the present invention.

The aqueous pigment ink composition of the present invention may contain a water-soluble cationic surfactant instead of the water-soluble cationic polymer or oligomer. The reason for this is that water resistance and light resistance of a recorded image after recording with the aqueous pigment ink composition are improved by addition of these compound.

This water-soluble cationic surfactant is not expected so much to have an ability to disperse a pigment, and it differs from a pigment dispersing agent usually used in this point. The reason for this is that the oxidized carbon black itself has excellent dispersibility and re-dispersibility in an aqueous medium.

In general, when lipophilic carbon black is dispersed in a water-based solvent, a dispersing agent is used. The dispersing agent should contain a hydrophilic group and lipophilic group placed in well balance, and the lipophilic group should be adsorbed on the surface of the carbon black. However, the water-soluble cationic polymer used in the present invention is not necessarily required to be adsorbed on the surface of the carbon black, therefore, the lipophilic group of the water-soluble cationic polymer may have weak lipophilicity by comparison with usual dispersing agents.

However, dispersion stability and discharging stability of the aqueous pigment ink composition should not be harmed by including the water-soluble cationic surfactant. Therefore, it is necessary to use the water-soluble cationic surfactant which can wrap carbon black in fine particulate condition to prevent the formation of bulky flocculates in drying. The water-soluble cationic polymer or oligomer should be easily re-dissolved, in order to avoid setting of ink in an orifice or nozzle.

Examples of such surfactants include an aliphatic amine salt represented by the formula:

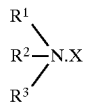

(wherein, $R^1$ is an alkyl group having 8 to 18 carbon atoms, $R^2$ and $R^3$ are a hydrogen atom or alkyl group having 1 to 18 carbon atoms, X is an organic acid such as acetic acid and methylsulfuric acid or an inorganic acid such as hydrochloric acid and sulfuric acid), a quaternary ammonium salt represented by the formula:

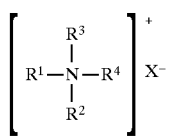

(wherein, $R^1$, $R^2$ and $R^3$ are an alkyl group having 1 to 18 carbon atoms, $R^4$ is an alkyl group having 1 to 18 carbon atoms, phenyl group or benzyl group, X is Cl, Br or I), a pyridinium salt represented by the formula:

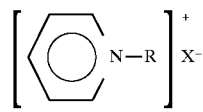

(wherein, $R^1$ is an alkyl group having 8 to 18 carbon atoms, X is Cl, Br or I), an imidazolinium salt represented by the formula:

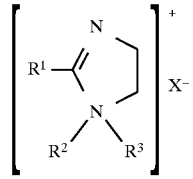

(wherein, $R^1$ is an alkyl group having 12 to 18 carbon atoms, $R^2$ is a hydroxyethyl group, methyl group or phenyl group, X is Cl, Br or I), and, benzotonium chloride represented by the formula:

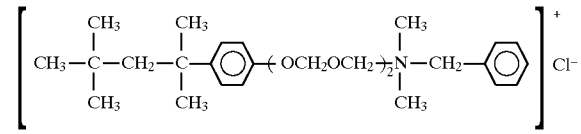

Specific examples of the water-soluble cationic surfactant used in the present invention include:
inorganic or organic acid salts of an aliphatic primary amine such as octylamine, laurylamine, stearylamine, oleylamine, tetradecylamine, hexadecylamine, coconut amine, coconut alkylamine, tallow amine, cured tallow alkylamine, soybean alkylamine and the like;
inorganic or organic acid salts of an aliphatic secondary amine such as distearylamine, dioleylamine, di-coconut alkylamine, di-cured tallow alkylamine and the like;
inorganic or organic acid salts of aliphatic tertiary amine such as dimethyloctylamine, dimethyldecylamine, dimethyllaurylamine, dimethylmyristylamine, dimethylpalmitylamine, dimethylstearylamine, dilaurylmonomethylamine, dioleylmonomethylamine, trioctylamine, dimethyl coconut amine, coconut alkyldimethylamine, tallow alkyldimethylamine, cured tallow alkyldimethylamine, soybean alkyldimethylamine, di-coconut alkylmonomethylamine, di-cured tallow alkylmonomethylamine and the like;
aliphatic quaternary ammonium salts such as tetramethylammonium chloride, tetraethylammonium chloride, tetrapropylammonium chloride, tetrabutylammonium chloride, lauryltrimethylammonium chloride, trioctylmethylammonium chloride, 3-chloro-2-hydroxypropyltrimethylammonium chloride, docosenyltrimethylammonium chloride, hexadecyltrimethylammonium chloride, octadecyltrimethylammonium chloride, coconut alkytrimethylammonium chloride, tallow alkyltrimethylammonium chloride, octadecyldimethyl (3-trimethoxysilylpropyl) ammonium chloride and the like;
aromatic quaternary ammonium salts such as benzyltrimethylammonium chloride, benzyltriethylammonium chloride, benzyltributylammonium chloride, benzyltrimethylammonium chloride, phenyltrimethylammonium chloride, cetyldimethylbenzylammonium chloride and the like;

pyridinium salt type compounds (for example, octylpyridinium chloride, cetylpicolinium chloride), imidazoline type cationic compounds (for example, 2-heptadecenyl-hydroxyethylimidazolium chloride), benzotonium chloride, ethylene oxide added type quaternary ammonium salts (for example, polyoxyethylenetrimethylammonium chloride), hydrochloride or acetate of aliphatic amides;

salt of polyethylenepolyamine aliphatic amides;

salt of urea condensate of polyethylenepolyamine aliphatic amides;

quaternary ammonium salt of urea condensate of polyethylenepolyamine aliphatic amides; and N,N-dialkylmorphonium salts;

and the like.

These water-soluble cationic surfactant are preferably added in an amount from 0.1 to 20% by weight, preferably from 1 to 10% by weight, further preferably from 1 to 5% by weight based on the total amount of the aqueous pigment ink composition of the present invention; or in an amount from 0.1 to 1 fold, preferably from 0.5 to 1 fold, further preferably about 1 fold by weight of the oxidized carbon black contained in the present invention.

In the pigment ink composition of the present invention, wetting ability for the nozzle of an ink jet recording head is improved by addition of these surfactants, and printing unevenness disappears.

Regarding the reaction product of carbon black and hypohalite, it is said that, in general, various functional groups existing on the surface of the carbon black are oxidized to become carboxyl groups and hydroxyl groups. It is preferable that a part of the acidic groups and a cationic surfactant form salts. The reason for this is that water resistance of this carbon black is improved by the formation of salts. However, if all of the acidic groups existing on the surface of the carbon black and a cationic surfactant form salts, hydrophilicity has been endowed with the carbon black is lost, consequently, flocculation and precipitation of pigment easily occur, and properties of the ink decrease.

Further, a water-soluble resin can optionally be added in the range which does not interfere with the effect of the present invention.

It is preferable that the water-soluble pigment ink composition of the present invention further contains a basic dye. The reason for this is that density and hue of a recorded image after recording with the aqueous pigment ink composition are improved by addition of the basic dye. In this specification, the term "basic dye" means the dye having at least one basic nitrogen atom in a molecule. The basic nitrogen atom means the nitrogen atom which is ionized or quaternized in an aqueous medium by an acidic compound (for example mineral acid: hydrochloric acid, sulfuric acid, methylsulfuric acid, acetic acid) to show cationic property. Specific examples of the basic dye include di- and triarylmethane-based dyes; quinoneimine-based dyes such as azine-based (including nigrosine), oxazine-based, thiazine-based and the like; xanthene-based dyes; triazol azo-based dyes; thiazol azo-based dyes; benzothiazol azo-based dyes; azo-based dyes; methine-based dyes such as polymethine-based, azomethine-based, azamethine-based and the like; anthraquinone-based dyes; phthalocyanine-based dyes, and the like. Preferable examples are di- and triarylmethane-based dyes, quinoneimine-based dyes and anthraquinone-based dyes.

Further, it is particularly preferable that the basic dye used in the present invention is water-soluble itself, or ionized or quaternized to become water-soluble or to become alcohol-soluble.

Further specific examples of yellow basic dyes used in the present invention include the dyes described in COLOR INDEX such as C. I. Basic Yellows-1, -2, -9, -11, -12, -13, -14, -15, -19, -21, -23, -24, -25, -28, -29, -32, -33, -34, -35, -36, -41, -51, -63, -73, -80 and the like.

As a commercially available yellow basic dye,

Aizen Cathilon Yellow GPLH (trade name; manufactured by Hodogaya Kagaku K.K.) and the like are included.

Examples of orange basic dyes include the dyes described in COLOR INDEX such as C. I. Basic Oranges-1, -2, -7, -14, -15, -21, -22, -23, -24, -25, -30, -32, -33, -34 and the like.

Examples of red basic dyes include the dyes described in COLOR INDEX such as C. I. Basic Reds-1, -2, -3, -4, -8, -9, -12, -13, -14, -15, -16, -17, -18, -22, -23, -24, -25, -26, -27, -29, -30, -32, -34, -35, -36, -37, -38, -39, -40, -41, -42, -43, -46, -49, -50, -51, -52, -53 and the like.

As a commercially available red basic dye,

Aizen Cathilon Red BPLH, Aizen Cathilon Red RH (trade names; manufactured by Hodogaya Kagaku K.K.), Diacryl Supra Brilliant Red 2G, Diacryl Supra Brilliant Red 3B, Diacryl Supra Red NRL (trade names; manufactured by Mitsubishi Kagaku K.K.), Sumiacryl Red B (trade name; manufactured by Sumitomo Kagaku K.K.) and the like are included.

Examples of violet basic dyes include the dyes described in COLOR INDEX such as C. I. Basic Violets-1, -2, -3, -4, -5, -6, -7, -8, -10, -11, -12, -13, -14, -15, -16, -18, -21, -23, -24, -25, -26, -27, -28, -29, -33, -39 and the like.

Examples of blue basic dyes include the dyes described in COLOR INDEX such as C. I. Basic Blues-1, -2, -3, -5, -6, -7, -8, -9, -15, -18, -19, -20, -21, -22, -24, -25, -26, -28, -29, -33, -35, -37, -40, -41, -42, -44, -45, -46, -47 -49, -50, -53, -54, -58, -59, -60, -62, -63, -64, -65, -66, -67, -68, -69, -70, -71, -75, -77, -78, -79, -82, -83, -87, -88 and the like.

As a commercially available blue basic dye, Aizen Cathilon Turquoise Blue LH, Aizen Cathilon Brilliant Blue F3RLH (trade names; manufactured by Hodogaya Kagaku K.K.), Diacryl Supra Brilliant Blue 2B, Diacryl Supra Brilliant Blue RHL, Diacryl Supra Blue BL (trade names; manufactured by Mitsubishi Kagaku K.K.), Sumiacryl Navy Blue R (trade name; manufactured by Sumitomo Kagaku K.K.) and the like are included.

Examples of green basic dyes include the dyes described in COLOR INDEX such as C. I. Basic Greens-1, -4, -6, -10 and the like.

As a commercially available green basic dye, Diacryl Supra Brilliant Green 2GL (trade name; manufactured by Mitsubishi Kagaku K.K.) and the like are included.

Examples of brown basic dyes include the dyes described in COLOR INDEX such as C. I. Basic Browns-1, -2, -4, -5, -7, -11, -12, -13, -15 and the like.

As a commercially available brown basic dye, Janus Brown R (trade name; manufactured by Nippon Kagaku K.K.), Aizen Cathilon Brown GH (trade name; manufactured by Hodogaya Kagaku K.K.) and the like.

Examples of black basic dyes include the dyes described in COLOR INDEX such as C. I. Basic Blacks-1, -2, -3, -7, -8 and the like, or Nigrosine-based basic dyes.

By addition of the above-described basic dyes, a recorded image having high print density and clear and excellent hue can be obtained, since the basic dyes complement the color of the carbon black. Namely, hue and printing density of the aqueous pigment ink composition can be suitably regulated or controlled by adding the above-described basic dyes alone or in combination of two or more.

In particular, finely dispersed carbon black easily becomes reddish black in general, and a violet basic dye or blue basic dye is preferably added for controlling hue of the aqueous pigment ink composition. By controlling hue, printing density of the recorded image which is recorded with the aqueous pigment ink composition are improved.

Further, in the aqueous pigment ink composition of the present invention, it is believed that a part of the acidic groups existing on the surface of the carbon black and a basic dye form salts. By this salt formation, water resistance of the recorded image which is recorded with this aqueous pigment ink composition is improved, and blurring is hardly caused in the recorded image. Therefore, minute letters can be clearly printed even in an ink jet recording method.

The basic dye is desired to be contained in an amount from 0.01 to 20% by weight, preferably from 0.03 to 10% by weight, further from 0.03 to 5% by weight based on the total amount of the ink. When the content is not more than 0.01% by weight, the carbon black can not be complemented and printing density is not improved. When over 20% by weight, flocculation and precipitation of the carbon black may occur, or co-precipitation of the carbon black with the basic dye may occur, and therefore, discharge from the orifice of the recording head of an ink jet printer or ball-point pen tip becomes poor.

The aqueous pigment ink composition of the present invention can optionally contain a water-miscible organic solvent. In this specification, water, a water-miscible organic solvent and a mixture thereof are referred to as an aqueous medium.

Examples of the water-miscible organic solvent include alkyl alcohols having 1 to 4 carbon atoms such as methyl alcohol, ethyl alcohol, n-propyl alcohol, isopropyl alcohol, n-butyl alcohol, sec-butyl alcohol and isobutyl alcohol; ketones or ketone alcohols such as acetone and diacetone alcohol; ethers such as tetrahydrofuran (THF) and dioxane; alkylene glycols such as ethylene glycol, propylene glycol, diethylene glycol and triethylene glycol; polyalkylene glycol such as polyethylene glycol and polypropylene glycol; lower alkyl ethers of polyhydric alcohol such as ethylene glycol monoethyl ether, propylene glycol monomethyl ether, diethylene glycol monomethyl ether and triethylene glycol monoethyl ether; lower alkyl ether acetate such as polyethylene glycol monomethyl ether acetate; glycerin; pyrrolidones such as 2-pyrrolidone, 2-methylpyrrolidone and N-methyl-2-pyrrolidone; and the like. The amount used of these organic solvents is not particularly restricted, and generally in the range of 3 to 50% by weight.

Since the aqueous pigment ink composition of the present invention is fully desalted and purified, no corrosion occur in writing instruments, ink jet printers and the like. Further, since a part of the carboxyl groups existing one the surface of the carbon black is converted to an ammonium salt and the like, there is not need to particularly control pH. Further, a part of the carboxyl groups may be converted to an alkaline metal salt derived from the alkaline metal (Na, K) salts of hypohalous acid.

The aqueous pigment ink composition of the present invention may contain a suitable amount of additives which are usually used in such kind of ink such as a viscosity regulator, antifungal agent, anticorrosion agent and the like.

According to the present invention, the ink composition which contains the carbon black excellent in water-dispersibility by comparison with the commercially available (acidic) carbon black as a coloring agent, is provided.

In the aqueous pigment ink composition of the present invention, fixing ability, printing density, gloss on recording paper and wetting ability for the nozzle of a recording head are improved by addition of a water-soluble cationic polymer, oligomer or water-soluble cationic surfactant.

The aqueous pigment ink composition of the present invention provides excellent recording and writing properties and realizes high speed printing and writing with no faint of letters.

Further, letters and drawings recorded on normal paper and coated paper having no absorptivity are excellent in fastness (water resistance and light resistance), and when they are immersed in water again, carbon black does not flow out.

Further, by adding the basic dye, the carbon black is complemented in color and the carbon black can be contained in high content, therefore, the aqueous pigment ink composition of the present invention provides high density of recorded image, and shows optical density equal to or more than that of a water-soluble black dye.

The following Examples further illustrate the present invention in detail but are not to be construed to limit the scope thereof.

EXAMPLE 1

Commercially available acidic carbon black "MA-100" (pH3.5) [manufactured by Mitsubishi Kagaku K.K.] (300 g) was mixed with 1000 ml of water and finely dispersed, then to this was added dropwise 450 g of sodium hypochlorite (effective chlorine content 12%), and the mixture was stirred for 10 hours at a temperature from 100° to 105° C. The resulting slurry was filtered through the Toyo filter paper No. 2 (manufactured by Advantis K.K.) and was washed with water until pigment particles leaked. This pigment wet cake was re-dispersed in 3000 ml of water, and desalted with reverse osmosis membrane until the electric conductivity reached 0.2 mS. Further, this pigment dispersion was concentrated to a pigment content of 10% by weight.

Separately, a part of the resulted pigment dispersion was treated with an acid (made to acidic, preferably pH2 using an aqueous hydrochloric acid solution, then re-purified), further concentrated, dried, and finely ground, to obtain a fine powder of carbon black. The oxygen content (% by weight) of the resulting carbon black was 8%.

The oxygen content (% by weight) of the (oxidized) carbon black was measured under the conditions shown in Table 1 according to Inert Gas Melting-Infrared Ray Absorption Method (JIS Z2613-1976 method).

TABLE 1

| Analysis conditions | |
|---|---|
| Analysis apparatus | HERAEUS CHN-O RAPIO full-automatic elemental analysis apparatus |
| Sample decomposition furnace temperature | 1140° C. |
| Fractionation tube temperature | 1140° C. |
| Gas used | Mixed gas of $N_2/H_2 = 95\%/5\%$ |
| Gas flow rate | 70 ml/min |
| Detector | Non-dispersing type spectrometer (Binos) |

EXAMPLE 2

To the pigment dispersion (50 g) obtained in Example 1 was added a solution obtained by dissolving 5 g of ethanol, 5 g of 2-methylpyrrolidone, 25.0 g of water and 15 g of PAA-L [polyallylamine having a weight average molecular weight of 10000, manufactured by Nitto Boseki K.K.: 20% aqueous solution] to obtain an aqueous pigment ink composition.

This ink composition had a viscosity of not more than 3.4 cps/25° C., and the average particle size of the carbon black was 150 nm.

The average particle size of the oxidized carbon black was measured by Laser Light Scattering Type Particle Size Distribution Measuring Machine [manufacture by Ootsuka Denshi K.K., trade name: LPA3000/3100].

Then, this pigment ink was set into an ink jet recording apparatus [trade name HG 5130 (manufactured by Epson K.K.) and printed on normal paper, to find that discharge of the ink was stable, printed quickly, the recorded image had gloss, the pigment did not flow when the recorded image was immersed in water after drying, and water resistance was excellent. The nozzle used was an ordinary one for an aqueous dye ink. The ink did not set, and when the ink was printed again after several hours, discharge did not become poor. Further, when this ink was stored at 50° C. for one month, no precipitation was produced, the average particle size and viscosity did not vary, and when the printing test was conducted again, the discharge of the ink was stable, and printing could be conducted smoothly. The optical density of a solid recorded image was measured by Macbeth densitometer TR-927 (manufactured by Collmogen K.K.) to find it was 1.34 which was a satisfactory value.

One gram of this ink was set in a petri dish. It was dried for 12 hours in a drying machine at 40° C., then to this was added 2 g of original ink. The mixture was gently shaken to dissolve the solid components completely within 30 seconds.

EXAMPLE 3

To the 10% pigment dispersion (50 g) obtained in Example 1 was added the solution obtained by dissolving 5 g of ethanol, 5 g of 2-methylpyrrolidone, 22.0 g of water and 18 g of PVAM0595B [polyvinylamine hydrochloride manufactured by Mitsubishi Kagaku K.K.: amine value 12 to 13 mg eq/g solid, aqueous solution containing a polymer having a weight average molecular weight of 60000 at a content of 17%] to obtain an aqueous pigment ink composition.

The resulting aqueous pigment ink composition was evaluated according to the same manner as in Example 2 to obtain the same results as in Example 2.

EXAMPLE 4

Commercially available carbon black "MA-8" (pH3.5) [manufactured by Mitsubishi Kagaku K.K.] (300 g) was mixed with 1000 ml of water, then to this was added dropwise 450 g of sodium hypochlorite (effective chlorine content 12%), and the mixture was stirred for 8 hours at a temperature from 100° to 105° C. To this reaction mixture was further added 100 g of sodium hypochlorite, then the mixture was dispersed for 3 hours at room temperature using a horizontal dispersing machine filled with beads to make the average particle size of the carbon black to about 100 nm. The resulted slurry was diluted to 10 fold in volume, regulated to pH2 with an aqueous hydrochloric acid solution, and desalted with reverse osmosis membrane until an electric conductivity reached 0.2 mS. Further, this pigment dispersion was controlled to pH7.0 using monoethanolamine, and was stirred for one hour. This pigment dispersion was further concentrated to a pigment content of 20% by weight.

Separately, a part of the pigment dispersion desalted and purified after the acid treatment was concentrated, dried and finely ground to obtain an oxidized carbon black fine powder. The oxygen content (% by weight) of the resulting carbon black was measured to find it was 10%.

EXAMPLE 5

To the pigment dispersion (25 g) obtained in Example 4 were added 62 g of water, 10 g of ethanol, 2.5 g of SP-012 [polyethyleneimine having an amine value of 19 mg eq/g solid, and a number average molecular weight of 1200, manufactured by Nippon Shokubai K.K.] and 0.5 g of triethylamine, and the mixture was stirred sufficiently to obtain an aqueous pigment ink composition. This ink composition had a viscosity of not more than 3.2 cps/25° C., and the average particle size of the carbon black was 100 nm.

Then, this pigment ink was set into an ink jet recording apparatus according to the same manner as in Example 2 and printed on normal paper, to find that discharge of the ink was stable, printed quickly, the recorded image had gloss, the pigment did not flow when the recorded image was immersed in water after drying, and water resistance was excellent. The nozzle used was an ordinary one for an aqueous dye ink. The ink did not set, and when the ink was printed again after several hours, discharge did not become poor. Further, when this ink was stored at 50° C. for one month, no precipitation was produced, the average particle size and viscosity did not vary, and when the printing test was conducted again, the discharge of the ink was stable, and printing could be conducted smoothly.

One gram of this ink was set in a petri dish. It was dried for 12 hours in a drying machine at 40° C., then to this was added 2 g of original ink. The mixture was gently shaken to dissolve the solid components completely within 30 seconds.

EXAMPLE 6

To the pigment dispersion (25 g) obtained in Example 4 were added 49.5 g of water, 5 g of ethanol, 5 g of 2-methylpyrrolidone, 15 g of PAA-L [polyallylamine having a weight average molecular weight of about 10000, manufactured by Nitto Boseki K.K.: 20% aqueous solution] and 0.5 g of triethylamine, and the mixture was stirred sufficiently to obtain an aqueous pigment ink composition.

The resulting aqueous pigment ink composition was evaluated according to the same manner as in Example 5 to obtain the same results as in Example 5.

EXAMPLE 7

Commercially available carbon black "#45" (pH8.0) [manufactured by Mitsubishi Kagaku K.K.] (300 g) was mixed with 1000 ml of water, then to this was added dropwise 450 g of sodium hypochlorite (effective chlorine content 12%), and the mixture was stirred for 8 hours at a temperature from 100° to 105° C. To this reaction mixture was further added 100 g of sodium hypochlorite, then the mixture was dispersed for 3 hours at room temperature using a horizontal dispersing machine filled with beads to make the average particle size of the carbon black equal to or less than about 100 nm. The resulted slurry was diluted to 10 fold in volume, regulated to pH2 with an aqueous hydrochloric acid solution, and desalted with reverse osmosis membrane until an electric conductivity reached 0.2 mS. Further, this pigment dispersion was controlled to pH7.0 using aqueous ammonia, and was stirred for one hour. This pigment dispersion was further concentrated to a pigment content of 20% by weight.

A part of the pigment dispersion was concentrated, dried and finely ground to obtain a carbon black fine powder, and the oxygen content (% by weight) of the resulting carbon black was measured to find it was about 10%.

EXAMPLE 8

To the pigment dispersion (25 g) obtained in Example 7 were added 62 g of water, 5 g of ethanol, 5 g of 2-methylpyrrolidone, 15 g of SP-012 [polyethyleneimine having an amine value of 19 mg eq/g solid, and a number average molecular weight of 1200, manufactured by Nippon Shokubai K.K.] and 0.5 g of diethylethanolamine, and the mixture was stirred sufficiently to obtain an aqueous pigment ink composition.

The resulting aqueous pigment ink composition was evaluated according to the same manner as in Example 5 to obtain the same results as in Example 5.

COMPARATIVE EXAMPLE 1

Acidic carbon black "MA-100" (pH3.5) [manufactured by Mitsubishi Kagaku K.K.] (500 g) were added 833 g of Malkyd 32-30WS [30% aqueous solution of Malkyd 32 (neutralizing agent; aqueous ammonia)] and 300 g of water, and the mixture was dispersed using a dispersing machine. Then the dispersion was diluted with water to a pigment content of 20%. To this slurry (25 g) were added 5 g of ethanol, 5 g of 2-methylpyrrolidone and water to make total amount to 100 g, and the resulting mixture was stirred sufficiently to obtain an aqueous pigment ink composition. This ink composition had a viscosity of not more than 4.5 cps/25° C., and the average particle size of the carbon black was 150 nm.

Then, this ink was set into an ink jet recording apparatus according to the same manner as in Example 2 and printed on normal paper, to find that discharge of the ink was small and density thereof was gradually lost until no printing at all. When the ink was printed again after several hours, the nozzle was clogged and printing ability was never recovered.

One gram of this ink was set in a petri dish. It was dried for 12 hours in a drying machine at 40° C., then to this was added 2 g of original ink. The mixture was gently shaken. However, the ink was not completely dissolved after 5 minutes and undissolved components remained.

COMPARATIVE EXAMPLE 2

To the pigment dispersion (50 g) obtained in Example 1 were added 5 g of ethanol, 5 g of 2-methylpyrrolidone, 0.5 g of triethanolamine and water to obtain 100 g of an aqueous pigment ink composition.

This ink composition had a viscosity of not more than 1.5 cps/25° C., and the average particle size of the carbon black was 150 nm.

Then, this ink was set into an ink jet recording apparatus according to the same manner as in Example 2 and printed on coated paper having no absorptivity, to find that discharge of the ink was stable, and printed quickly. However, the recorded image had no gloss, the density had unevenness, and the pigment flowed out when the recorded image was immersed in water after drying, and water resistance was poor.

COMPARATIVE EXAMPLE 3

A pigment ink composition was prepared using SAM 1000A [styrene-maleic acid resin having an acid value of 480, and a number average molecular weight of 1600, manufactured by ElfatoChem Japan K.K.] instead of the polyethyleneimine used in Example 5, according to the blending formulation shown in the following Table 2.

TABLE 2

| | |
|---|---|
| 20% pigment dispersion obtained in Example 4 | 25.0 g |
| SAM 1000A | 5.0 g |
| Water | 57.5 g |
| Ethanol | 5.0 g |
| 2-methylpyrrolidone | 5.0 g |
| 28% aqueous ammonia | 2.0 g |
| Triethanolamine | 0.5 g |

This ink composition had a viscosity of not more than 2.0 cps/25° C., and the average particle size of the carbon black was 100 nm.

Then, this ink was set into an ink jet recording apparatus according to the same manner as in Example 2 and printed on normal paper, to find that discharge of the ink was stable, printed quickly, and the recorded image had gloss. However, the pigment flowed out and blotting was observed when the recorded image was immersed in water after drying.

EXAMPLE 9

To the pigment dispersion (50 g) obtained in Example 1 was added a solution obtained by dissolving 10 g of ethanol, 5 g of 2-methylpyrrolidone, 35 g of water, and 5 g of tetrabutylammonium chloride to obtain an aqueous pigment ink composition.

This ink composition had a viscosity of not more than 3.0 cps/25° C., and the average particle size of the carbon black was 150 nm.

The average particle size of the oxidized carbon black was measured by Laser Light Scattering Type Particle Size Distribution Measuring Machine [manufacture by Ootsuka Denshi K.K., trade name: LPA3000/3100].

Then, this pigment ink was set into an ink jet recording apparatus [trade name HG 5130 (manufactured by Epson K.K.)] and printed on normal paper, to find that discharge of the ink was stable, printed quickly, and unevenness of the printed image did not occur. When the ink was printed again after several hours, discharge did not become poor. The pigment did not flow when the recorded image was immersed in water after drying, and water resistance was excellent. Further, when this ink was stored at 50° C. for one month, no precipitation was produced, the average particle size and viscosity did not vary, and when the printing test was conducted again, the discharge of the ink was stable, and printing could be conducted smoothly. The optical density of a solid recorded image was measured by Macbeth densitometer TR-927 (manufactured by Collmogen K.K.) to find it was 1.34 which was a satisfactory value.

EXAMPLE 10

An aqueous pigment ink composition was prepared according to substantially the same manner as described in Example 9, except that 3 g of benzyltributylammonium chloride was used instead of 5 g of tetrabutylammonium chloride. The aqueous pigment ink composition was evaluated to obtain the good results substantially the same as in Example 9.

EXAMPLE 11

Commercially available carbon black "MA-8" (pH3.5) [manufactured by Mitsubishi Kagaku K.K.] (300 g) was mixed with 1000 ml of water, then to this was added dropwise 450 g of sodium hypochlorite (effective chlorine content 12%), and the mixture was stirred for 8 hours at a temperature from 100° to 105° C. To this reaction mixture was further added 100 g of sodium hypochlorite, then the mixture was dispersed for 3 hours at room temperature using a horizontal dispersing machine filled with beads to make the average particle size of the carbon black to about 100 nm. The resulted slurry was diluted to 10 fold in volume, regulated to pH2 with an aqueous hydrochloric acid solution, and desalted with reverse osmosis membrane until an electric conductivity reached 0.2 mS. Further, this pigment dispersion was controlled to pH7.5 using monoethanolamine, and was stirred for one hour. This pigment dispersion was further concentrated to a pigment content of 20% by weight.

Separately, a part of the pigment dispersion desalted and purified after the acid treatment was concentrated, dried and finely ground to obtain an oxidized carbon black fine powder. The oxygen content (% by weight) of the resulting carbon black was measured to find it was 10%.

EXAMPLE 12

To the pigment dispersion (25 g) obtained in Example 11 were added 60 g of water, 5 g of ethanol, 5 g of 2-methylpyrrolidone, and 5 g of octylpyridinium chloride, and the mixture was stirred sufficiently to obtain an aqueous pigment ink composition. This ink composition had a viscosity of not more than 2 cps/25° C., and the average particle size of the carbon black was 100 nm.

Then, this pigment ink was set into an ink jet recording apparatus according to the same manner as in Example 9 and printed on normal paper, to find that discharge of the ink was stable, printed quickly, and unevenness of the printed image did not occur. When the ink was printed again after several hours, discharge did not become poor. The pigment did not flow when the recorded image was immersed in water after drying, and water resistance was excellent. Further, when this ink was stored at 50° C. for one month, no precipitation was produced, the average particle size and viscosity did not vary, and when the printing test was conducted again, the discharge of the ink was stable, and printing could be conducted smoothly. The optical density of a solid recorded image was measured by Macbeth densitometer TR-927 (manufactured by Collmogen K.K.) to find it was 1.34 which was a satisfactory value.

EXAMPLE 13

Commercially available carbon black "#45" (pH8.0) [manufactured by Mitsubishi Kagaku K.K.] (300 g) was mixed with 1000 ml of water, then to this was added dropwise 450 g of sodium hypochlorite (effective chlorine content 12%), and the mixture was stirred for 8 hours at a temperature from 100° to 105° C. To this reaction mixture was further added 100 g of sodium hypochlorite, then the mixture was dispersed for 3 hours at room temperature using a horizontal dispersing machine filled with beads to make the average particle size of the carbon black equal to or less than about 100 nm. The resulted slurry was diluted to 10 fold in volume, regulated to pH2 with an aqueous hydrochloric acid solution, and desalted with reverse osmosis membrane until an electric conductivity reached 0.2 mS. Further, this pigment dispersion was controlled to pH7.5 using aqueous ammonia, and was stirred for one hour. This pigment dispersion was further concentrated to a pigment content of 20% by weight.

A part of the pigment dispersion was concentrated, dried and finely ground to obtain a carbon black fine powder, and the oxygen content (% by weight) of the resulting carbon black was measured to find it was about 10%.

EXAMPLE 14

To the pigment dispersion (25 g) obtained in Example 13 were added 60 g of water, 5 g of ethanol, 5 g of 2-methylpyrrolidone, and 3 g of octylamine hydrochloride, and the mixture was stirred sufficiently to obtain an aqueous pigment ink composition. This ink composition had a viscosity of not more than 2 cps/25° C., and the average particle size of the carbon black was 100 nm.

COMPARATIVE EXAMPLE 4

Acidic carbon black "MA-100" (pH3.5) [manufactured by Mitsubishi Kagaku K.K.] (500 g) were added 250 g of tetrabutylammonium chloride, and 583 g of water, and the mixture was dispersed using a dispersing machine. Then the dispersion was diluted with water to a pigment content of 20%. To this slurry (25 g) were added 5 g of ethanol, 5 g of 2-methylpyrrolidone, and water to make total amount to 100 g, and the resulting mixture was stirred sufficiently to obtain an aqueous pigment ink composition. This ink composition had a viscosity of not more than 5 cps/25° C., and the average particle size of the carbon black was 150 nm.

Then, this ink was set into an ink jet recording apparatus according to the same manner as in Example 9 and printed on normal paper, to find that discharge of the ink was small and density thereof was gradually lost until no printing at all. When the ink was printed again after several hours, the nozzle was clogged and printing ability was never recovered.

COMPARATIVE EXAMPLE 5

To the pigment dispersion (50 g) obtained in Example 1 were added 5 g of ethanol, 5 g of 2-methylpyrrolidone, and 5 g of a nonionic surfactant Esomin C/15 (ethylene oxide adduct of alkyl amine, manufactured by Lion K.K.), and the resulting mixture was stirred. The carbon black flocculated and precipitated, and an aqueous pigment ink composition was not be prepared.

EXAMPLE 15

Commercially available acidic carbon black (trade name #970, manufactured by Mitsubishi Kagaku K.K.) (pH3.5) (300 g) was mixed well with 1000 ml of water and finely dispersed, then to this was added dropwise 450 g of sodium hypochlorite (effective chlorine content 12%), and the mixture was stirred for 10 hours at a temperature from 100° to 105° C. The resulting slurry was filtered through the filter paper No. 2 (manufactured by Advantis K.K.), and was washed with water until pigment particles leaked. This pigment wet cake was re-dispersed in 3000 ml of water, and desalted with reverse osmosis membrane until the electric conductivity reached 0.2 mS. Further, this pigment dispersion (pH=6.5) was concentrated to a pigment content of 10% by weight to obtain an oxidized carbon black pigment dispersion.

Separately, the resulted pigment dispersion was treated with an acid (made to acidic using an aqueous hydrochloric acid solution, then purified again), concentrated, dried, and finely ground, to obtain a powder of oxidized carbon black. The oxygen content of the resulting oxidized carbon black was 8%. On the other hand, the oxygen content of the raw material, acidic carbon black was 2%.

To the pigment dispersion (50 g) obtained in the above-described procedure were added 10 g of ethanol, 5 g of 2-methylpyrrolidone, further added 35 g of water and 1 g of C.I. Basic Blue 7 to obtain an aqueous pigment ink composition. This ink composition had a viscosity of 1.9 cps/25° C. measured by using E type viscometer (trade name "ELD", manufactured by Tokyo Keiki K.K.), and the average particle size of the carbon black was 80 nm. The average particle size of the oxidized carbon black was measured by a kinetic light scattering type particle size distribution measuring machine (manufactured by Leeds+Northrup K.K., trade name: MICROTRAC UPA).

Then, this ink was set into an ink jet recording apparatus (trade name HG 5130 (manufactured by Epson K.K.)), and printed on normal paper, to find that the nozzle was not clogged, printed quickly, and when the ink was printed again after several hours, poor discharge did not occur. The optical density of the resulting recorded image was measured by Macbeth densitometer (trade name TR-927, manufactured by Collmogen K.K.) to find it was 1.42 and the printing density was high and excellent. When the recorded image was immersed in water after drying, neither pigment nor dye flew out and water resistance was excellent. When this ink was stored for 1 month at 50° C., no precipitation was produced, the average particle size and viscosity did not vary, and when the printing test was conducted again, the discharge of the ink was stable and printing can be conducted smoothly.

Then, dispersibility of the aqueous pigment ink composition prepared, and water resistance and blotting of the recorded image were evaluated. The evaluation methods and criteria are shown below. The results obtained are shown in Table 3.

(a) Dispersibility test

An aqueous pigment ink composition was prepared. The ink composition was left for 3 hours. Then, it was observed visually.

Evaluation criteria o: Pigment or dye are uniformly dispersed, and flocculation and precipitation are not observed.

x: Flocculation and precipitation of pigment or dye are observed.

(b) Water resistance test

The prepared ink was set into an ink jet recording apparatus (trade name HG 5130 (manufactured by Epson K.K.)) and printed on normal paper, then it was dried. Then, the paper was immersed in water for 1 minute. The recorded image was compared and investigated before and after the immersion.

Evaluation criteria o: Pigment or dye do not flow from the recorded image, and no discoloration occur.

Δ: Pigment or dye flows out slightly from the recorded image or blotting slightly occurs, and consequently slight discoloration occurs.

x: Pigment or dye flows out from the recorded image or blotting occurs, and consequently considerable discoloration occurs.

(c) Blotting test

The prepared ink was set into an ink jet recording apparatus (trade name HG 5130 (manufactured by Epson K.K.)) and printed on normal paper, then the recorded image was observed by using a magnifying glass (10 magnification).

Evaluation criteria o: No blotting is observed in the recorded image.

Δ: Slight blotting is observed in the recorded image.

x: Considerable blotting is observed in the recorded image.

EXAMPLE 16

Commercially available acidic carbon black (Monark 1300 (trade name), manufactured by Cabott K.K.) (pH2.5) (300 g) was mixed well with 1000 ml of water and finely dispersed, then to this was added dropwise 450 g of sodium hypochlorite (effective chlorine content 12%), and the mixture was stirred for 8 hours at a temperature from 100 to 105° C. To this was further added 100 g of sodium hypochlorite (effective chlorine content 12%), and the mixture was dispersed for 3 hours by using horizontal dispersing machine. The resulting slurry was diluted to 10 fold in volume, regulated to pH2.0 with an aqueous hydrochloric acid solution, and desalted with reverse osmosis membrane until an electric conductivity reached 0.2 mS. Further, this pigment dispersion was controlled to pH7.5 using aqueous ammonia. This pigment dispersion was further concentrated to a pigment content of 20% by weight to obtain a pigment dispersion containing oxidized carbon black.

The resulted pigment dispersion which had been treated with acid was concentrated, dried, and finely ground, to obtain a fine powder of carbon black. The oxygen content (% by weight) of the resulting carbon black was 20%. On the other hand, the oxygen content of the raw material acidic carbon black was 12%.

To the pigment dispersion (25 g) obtained above were added 60 g of water, 5 g of ethanol, 5 g of 2-methylpyrrolidone, and 0.5 g of C.I. Basic Violet 1, and the mixtur e w as stirred to obtain an aqueous pigment ink composition. This ink had a viscosity of 2.3 cps/25° C., and the average particle size of the carbon black was 120 nm. Then, this ink was set into an ink jet recording apparatus according to the same manner as in Example 15 and printed, to find that printing could be conducted quickly without clogging of the nozzle, and when the ink was printed again after several hours, discharge did not become poor.

The optical density of the recorded image was 1.39, which means high printing density. The pigment nor dye did not flow when the recorded image was immersed in water after drying, and water resistance was excellent. Further, when this ink was stored at 50° C. for one month, no precipitation was produced, the average particle size and viscosity did not vary, and when the printing test was conducted again, the discharge of the ink was stable, and printing could be conducted smoothly.

Then, dispersibility of the aqueous pigment ink composition prepared, and water resistance and blotting of the recorded image using the composition were evaluated according to the same manner as in Example 15. The results are shown in Table 3.

EXAMPLE 17

A pigment dispersion containing oxidized carbon black having a pigment content of 20%, was obtained according to the same manner as described in Example 16.

An aqueous pigment ink composition was prepared according to the same manner as described in Example 16, except that C.I. Basic Blue 1 was used instead of C.I. Basic Violet 1.

This ink had a viscosity of 1.8 cps/25° C., and the average particle size of the carbon black was 120 nm. Then, this ink was set into an ink jet recording apparatus according to the same manner as in Example 16 and printed, to find that printing could be conducted quickly without clogging of the nozzle, and when the ink was printed again after several hours, discharge did not become poor.

The optical density of the recorded image was 1.40, which means high printing density. The pigment nor dye did not flow when the recorded image was immersed in water after drying, and water resistance was excellent. Further, when this ink was stored at 50° C. for one month, no precipitation was produced, the average particle size and viscosity did not vary, and when the printing test was conducted again, the discharge of the ink was stable, and printing could be conducted smoothly.

Then, dispersibility of the aqueous pigment ink composition prepared, and water resistance and blotting of the recorded image using the composition were evaluated according to the same manner as in Example 15. The results are shown in Table 3.

EXAMPLE 18

A pigment dispersion containing oxidized carbon black having a pigment content of 20%, was obtained according to the same manner as described in Example 16, except that 300 g of commercially available basic carbon black having a pH of 8.0 (#45 (trade name) manufactured by Mitsubishi Kagaku K.K.) was used instead of the commercially available acidic carbon black having a pH of 2.5 (Monark 1300 (trade name) manufactured by Cabott K.K.), and triethanolamine was used instead of aqueous ammonia to control pH to 7.5.

The resulted pigment dispersion which had been treated with acid was concentrated, dried, and finely ground, to obtain a fine powder of carbon black. The oxygen content (% by weight) of the resulting carbon black was 8%. On the other hand, the oxygen content of the raw material acidic carbon black was 2%.

An aqueous pigment ink composition was prepared according to the same manner as described in Example 16, except that C.I. Basic Blue 45 was used instead of C.I. Basic Violet 1.

This ink had a viscosity of 2.0 cps/25° C., and the average particle size of the carbon black was 55 nm. Then, this ink was set into an ink jet recording apparatus according to the same manner as in Example 16 and printed, to find that printing could be conducted quickly without clogging of the nozzle, and when the ink was printed again after several hours, discharge did not become poor.

The optical density of the recorded image was 1.39, which means high printing density. The pigment nor dye did not flow when the recorded image was immersed in water after drying, and water resistance was excellent. Further, when this ink was stored at 50° C. for one month, no precipitation was produced, the average particle size and viscosity did not vary, and when the printing test was conducted again, the discharge of the ink was stable, and printing could be conducted smoothly.

Then, dispersibility of the aqueous pigment ink composition prepared, and water resistance and blotting of the recorded image using the composition were evaluated according to the same manner as in Example 15. The results are shown in Table 3.

EXAMPLE 19

A pigment dispersion containing oxidized carbon black having a pigment content of 20%, was obtained according to the same manner as described in Example 16, except that 300 g of commercially available basic carbon black having a pH of 8.0 (#44 (trade name) manufactured by Mitsubishi Kagaku K.K.) was used instead of the commercially available acidic carbon black having a pH of 2.5 (Monark 1300 (trade name) manufactured by Cabott K.K.), and triethylamine was used instead of aqueous ammonia to control pH to 7.5.

The resulted pigment dispersion which had been treated with acid was concentrated, dried, and finely ground, to obtain a fine powder of carbon black. The oxygen content (% by weight) of the resulting carbon black was 7%. On the other hand, the oxygen content of the raw material acidic carbon black was 1%.

An aqueous pigment ink composition was prepared according to the same manner as described in Example 16, except that C.I. Basic Violet 3 was used instead of C.I. Basic Violet 1.

This ink had a viscosity of 2.1 cps/25° C, and the average particle size of the carbon black was 100 nm. Then, this ink was set into an ink jet recording apparatus according to the same manner as in Example 16 and printed, to find that printing could be conducted quickly without clogging of the nozzle, and when the ink was printed again after several hours, discharge did not become poor.

The optical density of the recorded image was 1.42, which means high printing density. The pigment nor dye did not flow when the recorded image was immersed in water after drying, and water resistance was excellent. Further, when this ink was stored at 50° C. for one month, no precipitation was produced, the average particle size and viscosity did not vary, and when the printing test was conducted again, the discharge of the ink was stable, and printing could be conducted smoothly.

Then, dispersibility of the aqueous pigment ink composition prepared, and water resistance and blotting of the recorded image using the composition were evaluated according to the same manner as in Example 15. The results are shown in Table 3.

COMPARATIVE EXAMPLE 6

To the pigment dispersion (50 g) obtained in Example 15 were added 10 g of ethanol, 5 g of 2-methylpyrrolidone and 35 g of water to obtain an aqueous pigment ink composition. This ink had a viscosity of 1.9 cps/25° C., and the average particle size of the carbon black was 80 nm. Then, this ink was set into an ink jet recording apparatus according to the same manner as in Example 15 and printed, to find that printing could be conducted quickly without clogging of the nozzle. However, the optical density of the recorded image was 1.30, which means low printing density.

Then, dispersibility of the aqueous pigment ink composition prepared, and water resistance and blotting of the recorded image using the composition were evaluated according to the same manner as in Example 15. The results are shown in Table 3.

COMPARATIVE EXAMPLE 7

To the pigment dispersion (50 g) obtained in Example 15 were added 5 g of ethanol, 5 g of 2-methylpyrrolidone, 1 g of C.I. Acid Blue 9, and water to make 100 g of an aqueous pigment ink composition. This ink had a viscosity of 2 cps/25° C., and the average particle size of the carbon black was 80 nm. Then, this ink was set into an ink jet recording apparatus according to the same manner as in Example 15 and printed, to find that printing could be conducted quickly without clogging of the nozzle. The optical density of the recorded image was 1.40, which means high printing density. However, the dye flowed out when the recorded image was immersed in water after drying, and water resistance was poor.

Then, dispersibility of the aqueous pigment ink composition prepared, and water resistance and blotting of the recorded image using the composition were evaluated according to the same manner as in Example 15. The results are shown in Table 3.

COMPARATIVE EXAMPLE 8

To commercially available basic carbon black having a pH of 8.0 (#44 (trade name) manufactured by Mitsubishi Kagaku K.K.) were added 75 g of water, 5 g of ethanol, 5 g of 2-methylpyrrolidone, 1 g of C.I. Basic Blue 7, and the mixture was stirred. The carbon black flocculated and precipitated.

Then, dispersibility of the aqueous pigment ink composition prepared, and water resistance and blotting of the recorded image using the composition were evaluated according to the same manner as in Example 15. The results are shown in Table 3.

TABLE 3

| Examples | Disp.[1] | Water resist.[2] | Blotting |
| --- | --- | --- | --- |
| 15 | ○ | ○ | ○ |
| 16 | ○ | ○ | ○ |
| 17 | ○ | ○ | ○ |
| 18 | ○ | ○ | ○ |
| 19 | ○ | ○ | ○ |
| Comp. 6 | ○ | Δ | Δ |
| Comp. 7 | ○ | x | x |
| Comp. 8 | x | ○ | ○ |

[1]Dispersibility
[2]Water resistance

What is claimed is:

1. An aqueous pigment ink composition comprising an oxidized carbon black obtained by wet-oxidation of a carbon black using a hypohalous acid and/or salt thereof, and a water-soluble cationic polymer or oligomer in an aqueous medium.

2. The aqueous pigment ink composition according to claim 1, wherein, said oxidized carbon black is obtained by wet-oxidation of a carbon black finely dispersed in water using a hypohalous acid and/or salt thereof.

3. The aqueous pigment ink composition according to claim 1, wherein, the oxygen content of said oxidized carbon black is not less than 5.0% by weight.

4. The aqueous pigment ink composition according to claim 1, wherein, the average particle size of said oxidized carbon black is not more than 300 nm.

5. The aqueous pigment ink composition according to claim 1, wherein, the content of said oxidized carbon black is from 0.1 to 50% by weight based on the total amount of the aqueous pigment ink composition.

6. The aqueous pigment ink composition according to claim 1, wherein, the weight average molecular weight of said water-soluble cationic polymer or oligomer is not more than 100000.

7. The aqueous pigment ink composition according to claim 1, wherein, the number average molecular weight of said water-soluble cationic polymer or oligomer is not more than 50000.

8. The aqueous pigment ink composition according to claim 1, wherein, said water-soluble cationic polymer or oligomer is selected from the group consisting of polyallylamine, polyethyleneimine, polyvinylamine and polyvinylpyrrolidone.

9. The aqueous pigment ink composition according to claim 1, wherein, the content of said water-soluble cationic polymer or oligomer is from 0.1 to 20% by weight based on the total amount of the aqueous pigment ink composition.

10. An ink jet recording solution comprising the aqueous pigment ink composition of claim 1.

11. An ink solution for writing implements comprising the aqueous pigment ink composition of claim 1.

12. An aqueous pigment ink composition comprising an oxidized carbon black obtained by wet-oxidation of a carbon black using a hypohalous acid and/or salt thereof, and a water-soluble cationic surfactant in an aqueous medium.

13. The aqueous pigment ink composition according to claim 12, wherein, said oxidized carbon black is obtained by wet-oxidation of a carbon black finely dispersed in water using a hypohalous acid and/or salt thereof.

14. The aqueous pigment ink composition according to claim 12, wherein, the oxygen content of said oxidized carbon black is not less than 5.0% by weight.

15. The aqueous pigment ink composition according to claim 12, wherein, the average particle size of said oxidized carbon black i s not more than 300 nm.

16. The aqueous pigment ink composition according to claim 12, wherein, the content of said oxidized carbon black is from 0.1 to 50% by weight based on the total amount of the aqueous pigment ink composition.

17. The aqueous pigment ink composition according to claim 12, wherein, said water-soluble cationic surfactant is a cationic surfactant selected from the group consisting of aliphatic amine salts, quaternary ammonium salts, pyridinium salts, imidazolinium salts and benzotonium salts.

18. The aqueous pigment ink composition according to claim 12, wherein, the content of said water-soluble cationic surfactant is from 0.01 to 20% by weight based on the total amount of the aqueous pigment ink composition.

19. An ink jet recording solution comprising the aqueous pigment ink composition of claim 12.

20. An ink solution for writing implements comprising the aqueous pigment ink composition of claim 12.

21. An aqueous pigment ink composition comprising an oxidized carbon black obtained by wet-oxidation of a carbon black using a hypohalous acid and/or salt thereof, and a basic dye in an aqueous medium.

22. The aqueous pigment ink composition according to claim 21, wherein, said oxidized carbon black is obtained by wet-oxidation of a carbon black finely dispersed in water using a hypohalous acid and/or salt thereof.

23. The aqueous pigment ink composition according to claim 21, wherein, at least a part of acidic groups existing on the surface of said oxidized carbon black is neutralized with at least one basic compound selected from the group consisting of ammonia, alkylamines, alkanolamines, alkylalkanolamines and alkaline metal hydroxides.

24. The aqueous pigment ink composition according to claim 21, wherein, the oxygen content of said oxidized carbon black is not less than 3% by weight.

25. The aqueous pigment ink composition according to claim 21, wherein, the average particle size of said oxidized carbon black is not more than 300 nm.

26. The aqueous pigment ink composition according to claim 21, wherein, the content of said oxidized carbon black is from 0.1 to 50% by weight based on the total amount of the aqueous pigment ink composition.

27. The aqueous pigment ink composition according to claim 21, wherein, the content of said basic dye is from 0.01 to 20% by weight based on the total amount of the aqueous pigment ink composition.

28. An ink jet recording solution comprising the aqueous pigment ink composition of claim 21.

29. An ink solution for writing implements comprising the aqueous pigment ink composition of claim 21.

* * * * *